Patented Aug. 23, 1932

1,873,443

UNITED STATES PATENT OFFICE

GEORG MATZDORF, OF DESSAU IN ANHALT, GERMANY, ASSIGNOR TO GENERAL ANILINE WORKS, INC., OF NEW YORK, N. Y., A CORPORATION OF DELAWARE

N-HYDROXYETHYLATED DERIVATIVES OF 1-AMINO- OR 2-AMINO-5-HYDROXYNAPHTHALENE-7-SULPHONIC ACID

No Drawing. Application filed January 3, 1930, Serial No. 418,417, and in Germany January 7, 1929.

My present invention relates to new naphthalene derivatives and more particularly to N-hydroxyethyl derivatives of 1-amino- or 2-amino-5-hydroxynaphthalene-7-sulphonic acid and to a process of manufacturing the same.

I have found that 1-amino- and 2-amino-5-hydroxynaphthalene-7-sulphonic acid are smoothly transformed into the corresponding N-hydroxyethyl derivatives by acting with ethylene oxide upon an aqueous solution of the alkali metal salts of the said sulphonic acids. In contradistinction to other aminohydroxynaphthalene sulphonic acids, the reaction proceeds smoothly with the 1-amino or 2-amino-5-hydroxynaphthalene-7-sulphonic acid and without formation of worthless by-products.

My new N-hydroxyethyl derivatives of 1-amino-5-hydroxynaphthalene-7-sulphonic acid and of 2-amino-5-hydroxynaphthalene-7-sulphonic acid are valuable intermediate products in the manufacture of dyes.

The reaction between an alkali metal salt of 1-amino- or 2-amino-5-hydroxynaphthalene-7-sulphonic acid and ethylene oxide may be carried out in a closed vessel. However, the reaction between the said components proceeds so smoothly that it is not necessary to perform the reaction in a pressure vessel and I prefer to use a reaction vessel provided with an inlet for the ethylene oxide and with means to avoid a loss of the latter. My new process preferably is performed at the beginning at a raised temperature, for instance, at 30 to 50° C. and finished at room temperature within 12 to 24 hours while stirring.

The quantity of ethylene oxide, I use, generally surpasses that required to form the N-mono-substituted aminohydroxynaphthalene compound and I prefer to use about the double quantity. Nevertheless, I obtain in the main the mono-substituted derivative. The excess of ethylene oxide is easily removed from the solution containing the reaction mass by boiling.

The following examples serve to illustrate my invention, the parts being by weight:—

*Example 1.*—239 parts of 2-amino-5-hydroxynaphthalene-7-sulphonic acid are dissolved in form of the sodium salt in about 2000 parts of water and at a temperature of 30 to 50° C., while stirring, 80 to 100 parts of gaseous ethylene oxide are introduced into the solution. Then the reacting liquid is stirred for 12 to 24 hours, care being taken that the ethylene oxide introduced into the solution does not escape from the reaction vessel. The reaction is finished, if a sample acidified with mineral acid, does not form a diazo compound after addition of sodium nitrite.

The solution of the N-hydroxyethylated aminohydroxynaphthalene sulphonic acid may be used directly in the manufacture of dyes. By evaporating the solution, the sodium salt of N-hydroxyethylated 2-amino-5-hydroxynaphthalene-7-sulphonic acid is obtained forming a resinous mass or when pulverized, a light gray powder. The new acid easily dissolves in water; from the aqueous solution it is separated neither by a mineral acid nor by addition of common salt.

*Example 2.*—239 parts of 1-amino-5-hydroxynaphthalene-7-sulphonic acid in form of the sodium salt, are dissolved in 2000 parts of water and treated with ethylene oxide under the conditions given in example 1. The solution of N-hydroxyethylated 1-amino-5-hydroxynaphthalene-7-sulphonic acid may be used directly in the manufacture of dyes. When adding 100 parts of hydrochloric acid of 23° Bé. to the solution while stirring, the new acid is obtained after cooling in crystallized form. The crystals are filtered with suction, washed with a small quantity of cold water and dried, whereat the 1-(N-hydroxyethyl)-amino-5-hydroxynaphthalene-7-sulphonic acid is obtained in the form of a nearly colorless crystalline powder. The acid is slightly soluble in cold, but easily soluble in hot water. After cooling it recrystallizes in form of colorless large crystals.

What I claim is:—

1. The process which comprises acting with ethylene oxide upon an aqueous solution of a water-soluble salt of an amino hydroxynaphthalene sulphonic acid of the general formula:

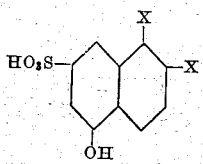

wherein one X means NH$_2$ and the other X represents H.

2. The process which comprises adding about 80 parts of ethylene oxide to an aqueous solution of about 239 parts of 1-amino-5-hydroxynaphthalene-7-sulphonic acid in the form of the sodium salt, while stirring, at a temperature of about 30 to about 50° C., and stirring the reaction solution at room temperature for about 12 to about 24 hours.

3. The process which comprises adding about 80 parts of ethylene oxide to an aqueous solution of about 239 parts of 2-amino-5-hydroxynaphthalene-7-sulphonic acid in form of the sodium salt while stirring at a temperature of about 30 to about 50° C., and stirring the reacting solution at room temperature for about 12 to about 24 hours.

4. As new products the N-hydroxyethylated amino-naphthalene sulphonic acids of the general formula

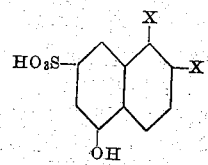

wherein one X means the radicle

and the other X means H, these compounds being soluble in water in the form of their sodium salts and yielding valuable dyes when coupled with aromatic diazo compounds.

5. As a new product the 1-(beta hydroxy ethyl)-amino-5-hydroxynaphthalene-7 - sulphonic acid of the formula:

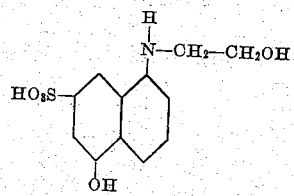

the free acid being slightly soluble in cold water, but easily soluble in hot water, recrystallizing from hot water, in large colorless crystals.

6. As a new product the 2-(beta hydroxy ethyl)-amino-5-hydroxynaphthalene - 7 - sulphonic acid of the formula

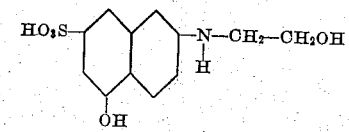

forming in the form of its sodium salt a grayish-white powder easily soluble in water and not precipitated by addition of hydrochloric acid or common salt.

In testimony whereof, I affix my signature.

GEORG MATZDORF.